(12) United States Patent
Pau et al.

(10) Patent No.: US 7,068,936 B2
(45) Date of Patent: Jun. 27, 2006

(54) METHODS AND APPARATUS FOR OPTICAL SWITCHING

(75) Inventors: Stanley Pau, Hoboken, NJ (US); Jianjun Yu, Murray Hill, NJ (US); Keisuke Kojima, Bridgewater, NJ (US); Naresh Chand, Warren, NJ (US)

(73) Assignee: Agere Systems Inc., Allentown, PA (US)

( * ) Notice: Subject to any disclaimer, the term of this patent is extended or adjusted under 35 U.S.C. 154(b) by 694 days.

(21) Appl. No.: 10/161,335

(22) Filed: Jun. 3, 2002

(65) Prior Publication Data

US 2004/0208555 A1    Oct. 21, 2004

(51) Int. Cl.
*H04J 14/00* (2006.01)
(52) U.S. Cl. .............................. 398/52; 398/53; 398/56
(58) Field of Classification Search ................... 398/45, 398/46, 47, 50, 52, 53, 55, 56, 74, 75, 98, 398/102
See application file for complete search history.

(56) References Cited

U.S. PATENT DOCUMENTS

| 6,512,612 B1 * | 1/2003 | Fatehi et al. .................. 398/49 |
| 2002/0126346 A1 * | 9/2002 | Suzuki et al. ................ 359/123 |

OTHER PUBLICATIONS

Sokoloff, J.P. et al., "A Terahertz Optical Asymmetric Demultiplexer (TOAD)", *IEEE Photonics Technology Letters*, vol. 5, No. 7, Jul. 1993, 787-790.

Thomsen, B.C. et al., "Ultrahigh speed all-optical demultiplexing based on two-photon absorption in a laser diode", *Electronic Letters*, vol. 34, No. 19, Sep. 17, 1998, pp. 1871-1872.

Doran, N.J. et al., "Nonlinear-optical loop mirror", *Optical Letters*, vol. 13, No. 1, Jan. 1988, pp. 56-58.

Yu, Jianjun et al., "160Gb/s single-channel unrepeatered transmission over 200km of nonzero-dispersion shifted fiber", Agere Systems, 2 pgs.

Deng, Kung-Li et al., "A rapidly Re-configurable Optical Channel Selector using a RF Digital Phase Shifter for Ultra-fast OTDM Networks", Bell Laboratories, Lucent Technologies, 2 pgs.

Bishop, David et al., "The Little Machines That Are Making It Big", *Physics Today*, Oct. 2001, pp. 38-44.

(Continued)

*Primary Examiner*—David C. Payne (57) ABSTRACT

Methods and apparatus for providing a time slot switch which performs switching in the optical domain without the need for O-E-O conversion is described. The time slot switching device of the present invention may be part of a large switching device capable of performing switching and other function on WDM, TDM and WDM signals which are time division multiplexed. An optical time slot switch implemented using a time slot demultiplexer, optical cross-connect, variable delay lines and time slot multiplexer are described. Frequency conversion may be performed on a per time slot basis in cases where time slot signals are switched between lines using different wavelengths. Wave division demultiplexers and multiplexers can be added to the basic time slot switch to provide support for WDM switching and switching of TDM signals which are transmitted using wave division multiplexing.

21 Claims, 8 Drawing Sheets

OTHER PUBLICATIONS

Ryf, R. et al., "1296-port MEMS Transparent Optical Crossconnect with 2.07 Petabit/s Switch Capacity", Lucent Technologies and Agere Systems, 3 pgs.

Leuthold, J. et al., "All Optical Nonblocking Terabit/s Crossconnect Based on Low Power All-Optical Wavelength Converter and Mems Switch Fabric", Bell Laboratories, Lucent Technologies, 3 pgs.

Neilson, D.T. et al., "High-dynamica Range Channelized MEMS Equalizing Filter", Bell Labs and Agere Systems, 3 pgs.

Durhuus, Terji et al., "All-Optical Wavelength Conversion by Semiconductor Optical Amplifiers", Journal of Lightwave Technology, vol. 14, No. 6, Jun. 1996, pp. 942-954.

* cited by examiner

*3 Ch. A time-slots and 1 Ch. B time-slot combined to 160 Gbit/s*

METHODS AND APPARATUS FOR OPTICAL SWITCHING

FIELD OF THE INVENTION

The present invention is directed to optical switching applications, and more particularly, to methods and apparatus for performing switching, adding and dropping operations in an optical time division multiplexing (OTDM) system.

BACKGROUND OF THE INVENTION

Many communications systems in use today use a combination of electrical and optical components to transmit data. Due to its high bandwidth and other advantages optical systems are often preferred for many communications applications over purely electrical communications systems. Unfortunately, due to the limitations of existing optical components, it is sometimes necessary to convert optical signals into electrical signals, perform a switching operation on the electrical signals, and then convert the switched electrical signals back into optical signals for further transmission. The need to perform electrical switching operations is particularly prevalent in the case of time division multiplexed systems due to the limitations of known optical switches to perform time slot switching in the optical domain.

Communication techniques such as TDM and WDM allow several channels of data to travel over a single communications line. In the case of optical time division multiplexing (OTDM) and optical wavelength division multiplexing (OWDM) the communications line is normally an optical fiber.

In OTDM different channels correspond to different time slots, with the data on a communications line corresponding to different channels being interspaced according to time slot allocation. In OWDM each channel corresponds to a different wavelength with the potential for multiple wavelengths, and thus channels, to be transmitted in parallel using a single communications line. In some communications systems a combination of the two methods is used to transmit data.

Adding, dropping and switching channels are basic functions needed to manage an optical transport network (OTN). In WDM, a channel is represented by a single wavelength and these functions can be performed, as is known in the art, by using an optical cross-connect (OXC) and/or an optical add/drop multiplexer (OADM) that is wavelength selective. Such devices can be implemented using micro electrical mechanical systems (MEMS), waveguides and/or liquid crystal technology.

Figure 1:
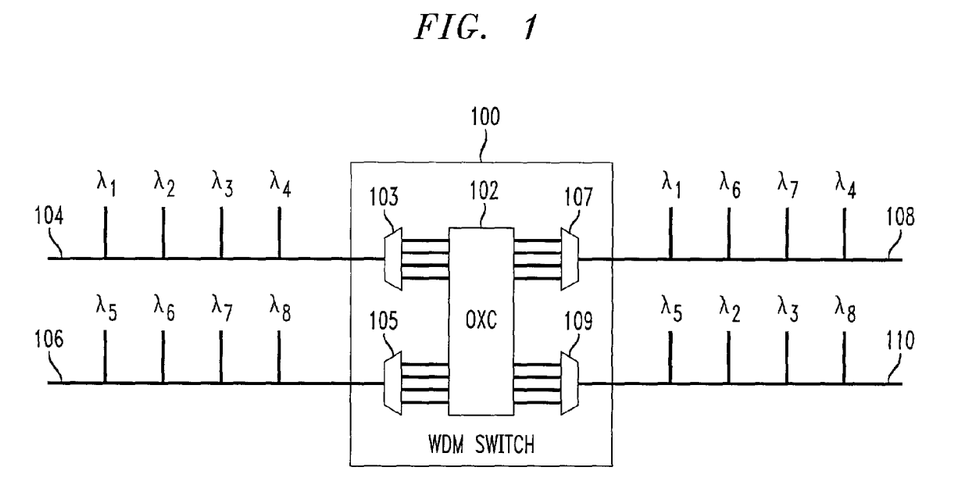
FIG. 1 illustrates a known 2×2 wavelength switch.

FIG. 1 illustrates an exemplary known 2×2 wavelength switch 100. The switch 100 includes two inputs and two outputs. Each input and output corresponds to a different line, e.g., fiber optic line, 104, 106, 108, 110 which is used to carry multiple wavelengths of light. Each wavelength $\lambda$ corresponds to a different communications channel. In FIG. 1, input line 104 carries, $\lambda 1$–$\lambda 4$ corresponding to a first set of four channels while input line 106 carries $\lambda 5$–$\lambda 8$ corresponding to another four input channels.

The switch 100 includes first and second wavelength division demultiplexers 103, 105, an optical cross connect switch (OXC) 102 and first and second wavelength division output multiplexers 107, 109.

First and second input multiplexers couple the first and second inputs of switch 100 to inputs of the optical cross connect switch (OXC) 102. The demultiplexers 103, 105 divide the inputs into individual channels according to wavelength. Each wavelength output by a demultiplexer 103, 105 is supplied to a different input of the OXC 102. The OXC 102 is capable of directing the signal received on any input to any output of the OXC 102. In this manner, the OXC 102 can be used to redirect input signals corresponding to line 104, 106 to the inputs of either of the first and second multiplexers 107, 109, corresponding to output lines 108, 110, respectively. Output multiplexers 107, 108 combine the wavelengths received at their inputs and output them on a single line 108, 110, respectively. By using the ability of the OXC 102 to redirect input signals to any output, it is possible to perform wavelength switching as shown in FIG. 1.

In the example of FIG. 1, channels $\lambda 6$ and $\lambda 7$ which are received on the second input line are switched so that they share the first output line 108 with channels $\lambda 1$ and $\lambda 4$ which were received on the first input line 104. In addition, channels $\lambda 2$ and $\lambda 3$ which are received on the first input line 104 are switched so that they share the second output line 110 with channels $\lambda 1$ and $\lambda 8$ which were received on the second input line 106.

Adding, dropping and switching channels has proven more difficult to implement in OTDM systems than OWDM systems since the same wavelength is used for multiple channels making it more difficult to separate out the different channels for optical signal processing. The difficulty of performing time slot switching in the optical domain has caused system designers to resort to performing time slot switching in the electrical, as opposed to optical, domain. Normally, in the case of OTDM, optical-electrical-optical (OEO) conversion is performed with the channels being manipulated, e.g., switched, in the electrical domain. The O-E-O conversions are bit-rate and wavelength dependent and often require complex circuits. A discussion of optical to electrical conversion for an OTDM application can be found in U.S. Pat. No. 5,278,698.

The OEO conversion has the potential to become a bottleneck as transfer rates increase. Optical processing has the potential for avoiding such a bottleneck while offering the potential for an end to end optical communications system.

Advances in communications technology are allowing communications, e.g., OTDM, networks to reach data transfers speeds of up to 160 Gbit/s, and beyond. Accordingly, there is an increasing need for new methods and apparatus for performing channel drop, add and switching functions in OTDM systems. As discussed above, it is desirable that any new methods and apparatus for performing such functions be capable of performing the functions in the optical domain, thereby eliminating the need to perform OEO conversion. It is also desirable that any new methods be capable of being combined with OWDM techniques to provide, at least in some embodiments, a device capable of performing both OTDM and OWDM functions. Such a device would then be suitable for use in hybrid networks that use a combination of multiplexing techniques, e.g., WDM and OTDM techniques.

The absence of OEO conversion has the potential of lowering the cost and complexity of an OTDM switching device, while allowing the device to process data more efficiently thereby allowing for potentially higher throughputs than the known OEO techniques.

In view of the above discussion, it is apparent that there is a need for improved methods and apparatus for performing adding, dropping and/or channel switching operations in systems which use OTDM.

SUMMARY OF THE INVENTION

The present invention is directed to methods and apparatus for performing time slot switching in the optical domain, i.e., without the need for O-E-O conversion.

In accordance with the present invention an optical timeslot switch is implemented using a time slot demultiplexer, an optical cross-connect, and variable delay lines, and a time slot multiplexer. A feedback monitor is used in various embodiments to control synchronization of the variable delay lines used to perform time slot switching.

In one exemplary embodiment, time division multiplexed signals corresponding to, e.g., different fiber optic input lines, are time slot demultiplexed. Each time slot demultiplexed signal, e.g., each signal corresponding to a different TDM channel, is supplied to a different input of the OXC. The OXC is used to switch, pass, add, and drop signals corresponding to different communications channels as desired. Each output of the OXC, e.g., each signal corresponding to a TDM channel is subject to a variable delay to allow for time slot switching. Variable delay lines may be used to implement synchronize the signals to be transmitted on a single fiber using TDM. The OXC output signals to be transmitted on a fiber or wavelength are coupled to a time slot multiplexer associated with the fiber or wavelength by the variable delay lines. After synchronization of the time slot signals to be transmitted on a fiber or wavelength by the variable delay lines, the signals are time division multiplexed. In cases where the wavelength used to transmit the switched signal differs from the original wavelength, wavelength conversion can be employed, e.g., on a time slot signal basis. Wavelength conversion can occur before or after processing by the OXC at any point between time division demultiplexing and time slot multiplexing.

The optical time slot switching techniques of the present invention can be combined with wavelength division multiplexing and demultiplexing functionality to provide a switching device capable of providing switching, adding, dropping and passing functionality for OTDM signals, WDM signals and WDM signals which are time division multiplexed. Since this functionality is provided in the optical domain with out the need for O-E-O conversion, the methods and apparatus of the present invention offer several advantages over the prior art systems which use O-E-O conversion.

Numerous additional features, benefits and details of the methods and apparatus of the present invention are described in the detailed description which follows.

DETAILED DESCRIPTION

Figure 2:
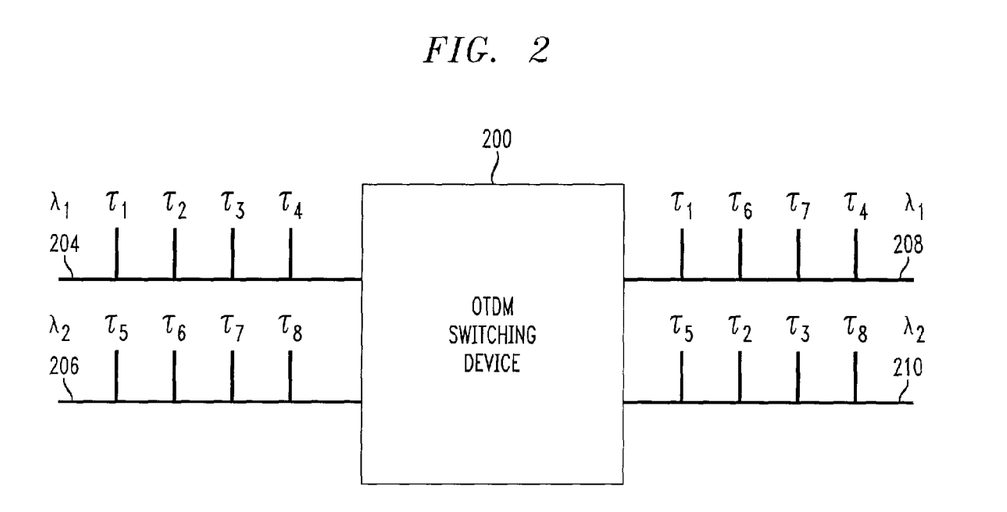
FIG. 2 illustrates an exemplary 2×2 optical time slot switching device 200 of the present invention.

FIG. 2 illustrates a 2×2 timeslot switching device 200 implemented in accordance with the invention. The switching device 200 has first and second inputs which are coupled to lines 204, 206, respectively and first and second outputs which are coupled to lines 208, 210, respectively. In the FIG. 2 example, time division multiplexing is used. The first input and output lines 204, 208 carry light of a single wavelength $\lambda 1$ while the second input and output lines 206, 210 carry light of a second wavelength $\lambda 2$. $\lambda 1$ and $\lambda 2$ may be the same wavelength or different wavelengths.

Timeslots $\tau$ are used in the FIG. 2 embodiment to distinguish between different communications channels. Input line 1 carries four communications channels identified by their assigned time slots $\tau 1$, $\tau 2$, $\tau 3$ and $\tau 4$ while the second input line 206 carries an additional four communications channels identified as $\tau 5$, $\tau 6$, $\tau 7$ and $\tau 8$.

While the FIG. 2 embodiment illustrates a 2×2 time-slot switching device, the present invention is scalable to an N×N design. MEMS based cross-connects exist in the art from 2×2, to 256×256 to 1296×1296. The number of timeslot channels in the FIG. 2 embodiment, i.e., four, is also exemplary. The present invention may, in some embodiments, be scaled to accommodate more or less than four time-slot channels. Scalability and upgradability to higher port counts is a useful feature of the present invention.

As will be discussed in further detail below, the timeslot switch 200 switches data between different channels in the optical domain. In the FIG. 2 example, before entering switching device 200, channels $\tau 1$, $\tau 2$, $\tau 3$ and $\tau 4$ share input line 204, but after switching, channels $\tau 1$, $\tau 6$, $\tau 7$ and $\tau 4$ share output line 206. Similarly, before entering switching device 200, channels $\tau 5$, $\tau 6$, $\tau 7$ and $\tau 8$ share input line 206, but after switching, channels $\tau 5$, $\tau 2$, $\tau 3$ and $\tau 8$ share output line 210. Accordingly, OTDM switching device 200 can swap the data from any channel, e.g., time slot, of first input line 204 with the data from any channel of second input line 206 to perform any desired time slot switching operation between input and output channels. In cases where an input channel is switched from an input line using a first wavelength to an output channel of a line which uses a different wavelength, the switching device 200 will perform the necessary wavelength conversion in addition to time slot switching.

Various components of the OTDM switching device 200 will now be described with reference to FIG. 3A. In addition, techniques for combining the OTDM switching device 200 with additional components to produce a switching device 300 capable of performing both WDM and OTDM switching in the optical domain will be described.

Figure 3A:
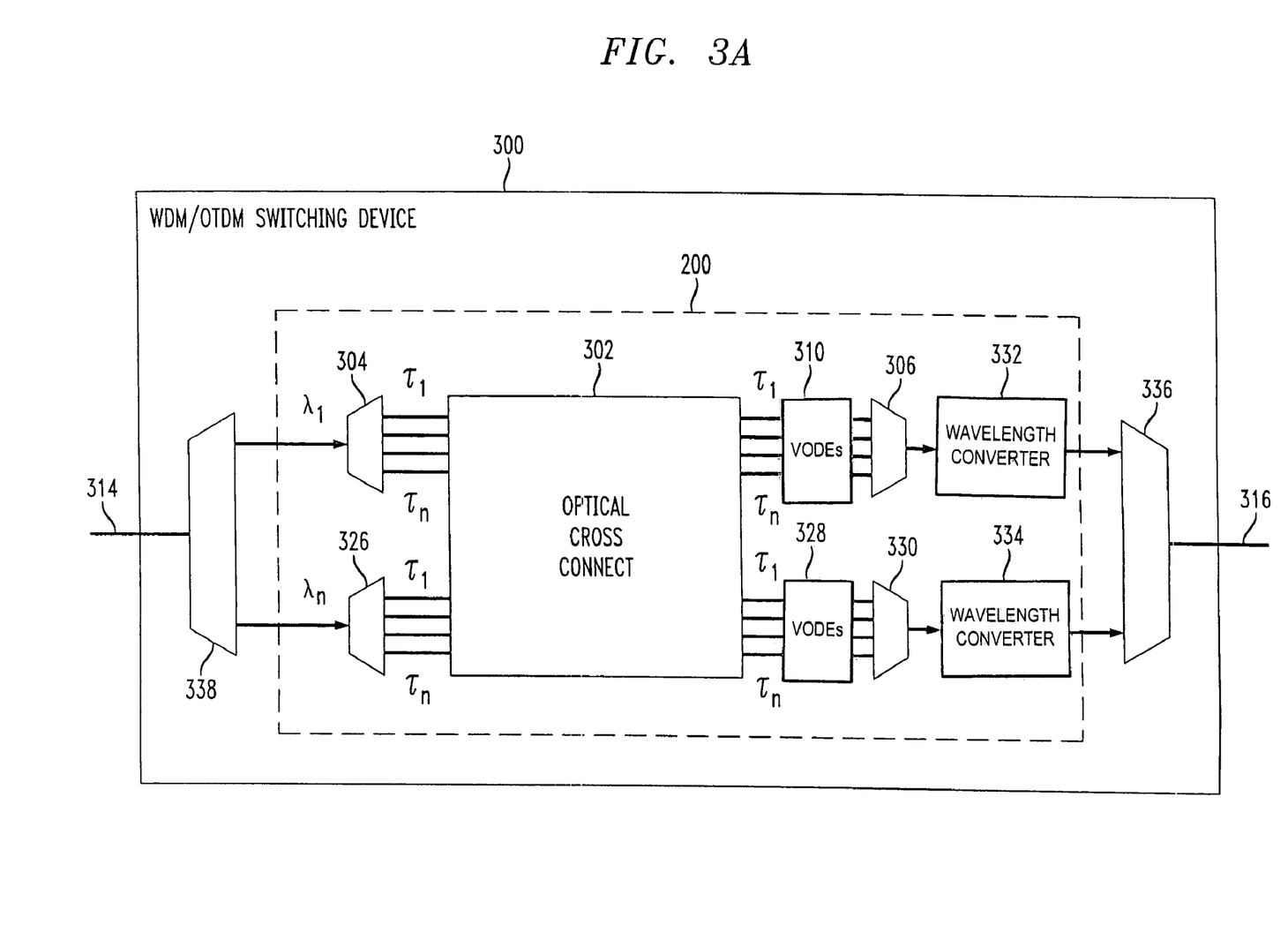
FIG. 3A illustrates an WDM/OTDM switching device implemented in accordance with the present invention which includes the optical time slot switching device shown in FIG. 2.

FIG. 3 illustrates an exemplary switching device 300 implemented in accordance with one embodiment of the present invention. Switching device 300 may be used as part of a combination WDM/OTDM network. In such a combination network, one communication line, e.g., input line 314, carriers a plurality of channels represented by different wavelengths as is common in WDM systems. Each of these wavelength channels may include one or more channels corresponding to different time slots. Thus, TDM may be used on each WDM channel. The switching device 300 is designed to switch channels between timeslots and wavelengths in the optical domain, i.e., without the need of OEO conversion.

The switch 300 includes a wavelength demultiplexer 338, an OTDM switching device 200 and a wavelength multiplexer 336. The switching device 300 receives signals at the input to wavelength demultiplexer 338 via input line 314. The received signals are demultiplexed according to wavelength resulting in multiplexer outputs λ1 through λn, each of which corresponds to a different WDM communications channel. The signals corresponding to the individual WDM communications channels are supplied to different inputs of OTDM switching device 200 of the present invention.

OTDM switching device 200 comprises time slot demultiplexers 304, 326, an OXC 302, variable optical time delay elements (VODEs) 310, 328, time division multiplexers 306, 330, and wavelength conversion devices 332, 334. Optical time slot demultiplexers and multiplexers decompose or combine time-slots corresponding to a single wavelength. Time slot multiplexers used in the system of FIG. 3 should have a response that is at least as fast as the signal being processed. Existing multiplexers are based on fast optical nonlinearity which has a very short transition time constant. Several existing high-speed all-optical demultiplexing systems suitable for use in the system of FIG. 3 have been demonstrated. A linear optical loop mirror demultiplexer based on the Kerr effect in optical fibers, a terahertz optical loop mirror demultiplexer based on nonlinearities associated with carrier depletion in semiconductor optical amplifiers, an electro-absorption modulator based on ultrafast modulation of the refractive index and a two photon absorption switch based on a nonlinear optical to electrical conversion process in laser diodes are examples of existing multiplexer technologies which can be used when implementing the system of FIG. 3.

Each output of the time slot demultiplexers, is supplied to a different input of the OXC 302. Thus, there is one input to the OXC 302 for each communication channel, whether it be a WDM or TDM communication channel, transmitted using input line 314. There are also a corresponding number of OXC outputs.

The OXC 302 allows signals received on any one of the OXC inputs to be transmitted to any one of the OXC outputs. In order to support time slot switching and time division multiplexing, variable optical time delay elements and time slot multiplexers (310, 306) (328, 330) are supplied for each wavelength used to transmit TDM channels. Each time delay element includes, in one embodiment, a plurality of variable time delay lines, e.g., one for each TDM channel. By selectively varying the delay applied to individual outputs of the OXC 302 prior to multiplexing, time slot switching is achieved and the output time slots are synchronized relative to one another as desired. Variable delay lines used to achieve synchronization can be implemented using various techniques such as separating two collimated fibers by mechanical stages, temperature tuning of fibers by large or localized heaters, or stretching of fibers using piezoelectric crystal. As will be discussed further below, an active feedback mechanism may be used to monitor the quality of time division multiplexed signals produced by multiplexers 306, 330 with feedback being used to change individual variable delay lines to maintain satisfactory synchronization between the signals being multiplexed together.

Wavelength converters 332, 334 are supplied in the FIG. 3 embodiment to support wavelength conversion where the input wavelength differs from the wavelength to be used to transmit a switched signal. Wavelength conversion is performed on a per time slot (TDM channel) basis. Thus, wavelength conversion may be applied to some multiplexed OXC outputs but not others. While wavelength conversion is shown as being performed at the outputs to multiplexers 306, 330 it is to be understood that frequency conversion can be preformed elsewhere in switching device 200, e.g., before input to the OXC 302 or at the output of OXC 302 prior to prior to or after processing by variable delay units 310, 328.

In the FIG. 3A example the time division multiplexed signals corresponding to a single wavelength λ1 and λ2, output by frequency conversion circuits 332, 334 respectively, correspond to the outputs of the switching device 200 shown in FIG. 2.

Each of the time division multiplexed outputs of the switching device 200 are supplied to inputs of the wave division multiplexer 336 which multiplexes the signals corresponding to the two wavelengths, λ1 and λ2, for transmission over the single output line 316 of the WDM/OTDM switching device 300.

The switch 300 may include various filters (not shown) for choosing a desired signal and suppressing noise, routing logic for directing the received data (not shown), fiber amplifier for increasing light intensity (not shown), dispersion and polarization controllers to improve signal quality (not shown), and a CPU (not shown) for executing and/or controlling various operations of the present invention such as implementing and synchronizing variable time delays.

Depending on the number of different wavelength channels used by a network, the switch 300 can be scaled to accommodate more wavelength channels by adding additional sets of circuitry used to process a WDM channel including, e.g., a demux 304, variable time delay unit 310, mux 306 and frequency conversion device 332. In cases where some WDM channels do not support TDM, such processing elements, at least for some of the inputs, can be avoided leading to a simplified design.

Figure 3B:
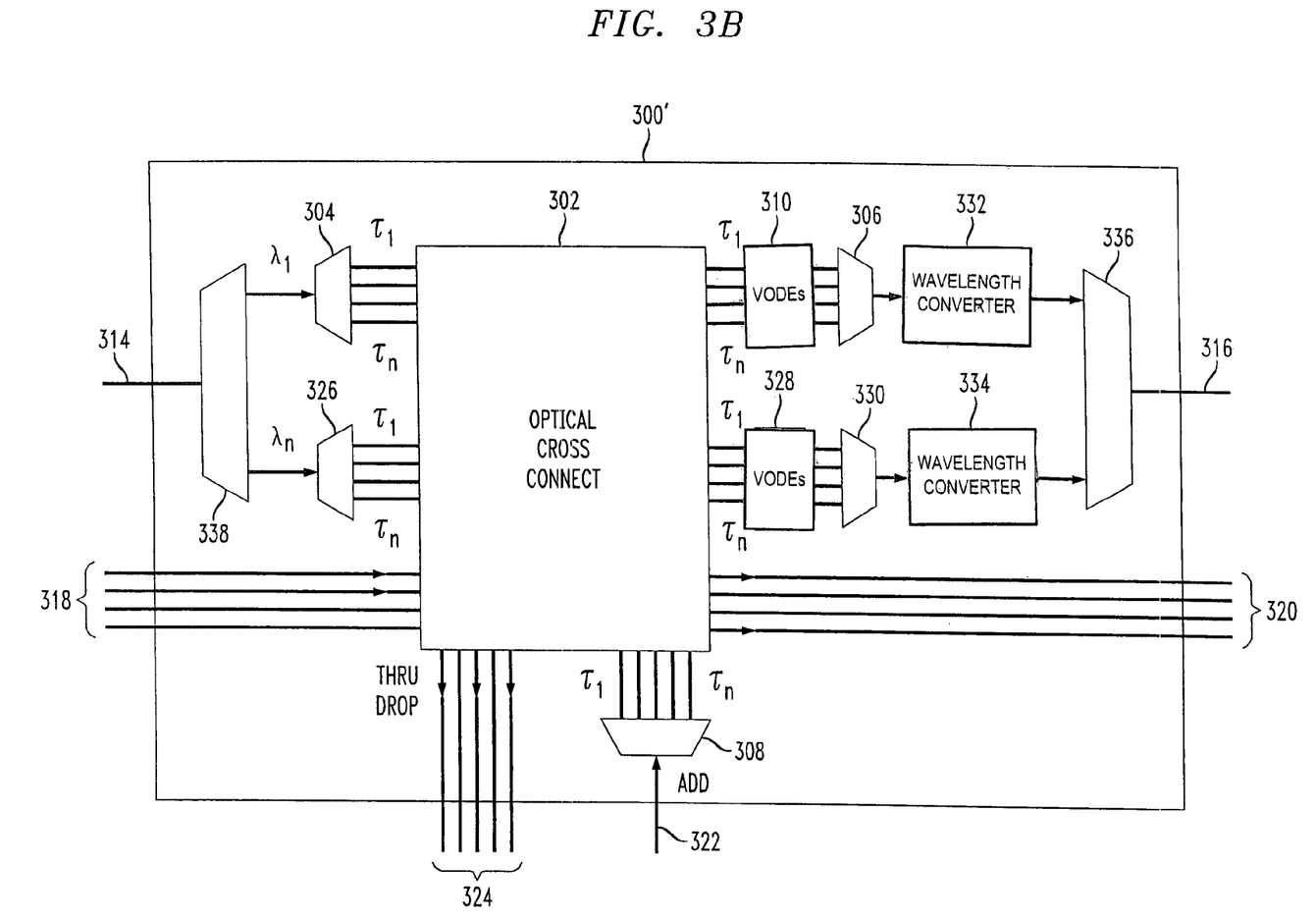
FIG. 3B illustrates another WDM/OTDM switching device implemented in accordance with the invention.

The switching device 300 can be easily modified as shown in FIG. 3B to produce a switch 300' with the ability to add and drop channels in addition to switch channels. It can also switch one or more channels without performing TDM processing operations in cases where an input signal is not time division multiplexed.

In the FIG. 3B embodiment, OXC inputs 318 and outputs 320 are used for signals which are pass through the OXC without being subject to time slot switching, e.g., because they are not TDM signals or because time slot switching of these signals is not desired. Outputs 324 may be used, e.g., for signals which are to be dropped. Input 322 corresponds to a TDM signal whose channels are to be added, e.g., to replace dropped channels. Prior to switching by OXC 302, the channels corresponding to input 322 are demultiplexed by time division demultiplexer 308.

Thus, using a switching device 300' of the present invention, basic operations such as channel switching, adding and dropping can be performed in the optical domain on WDM and/or TDM optical signals without the need for O-E-O conversions. The switches 300 and 300' of the present invention are well suited for use as node in a optical communications system, e.g., a system using a mesh network of nodes to communicate data.

Figure 4:
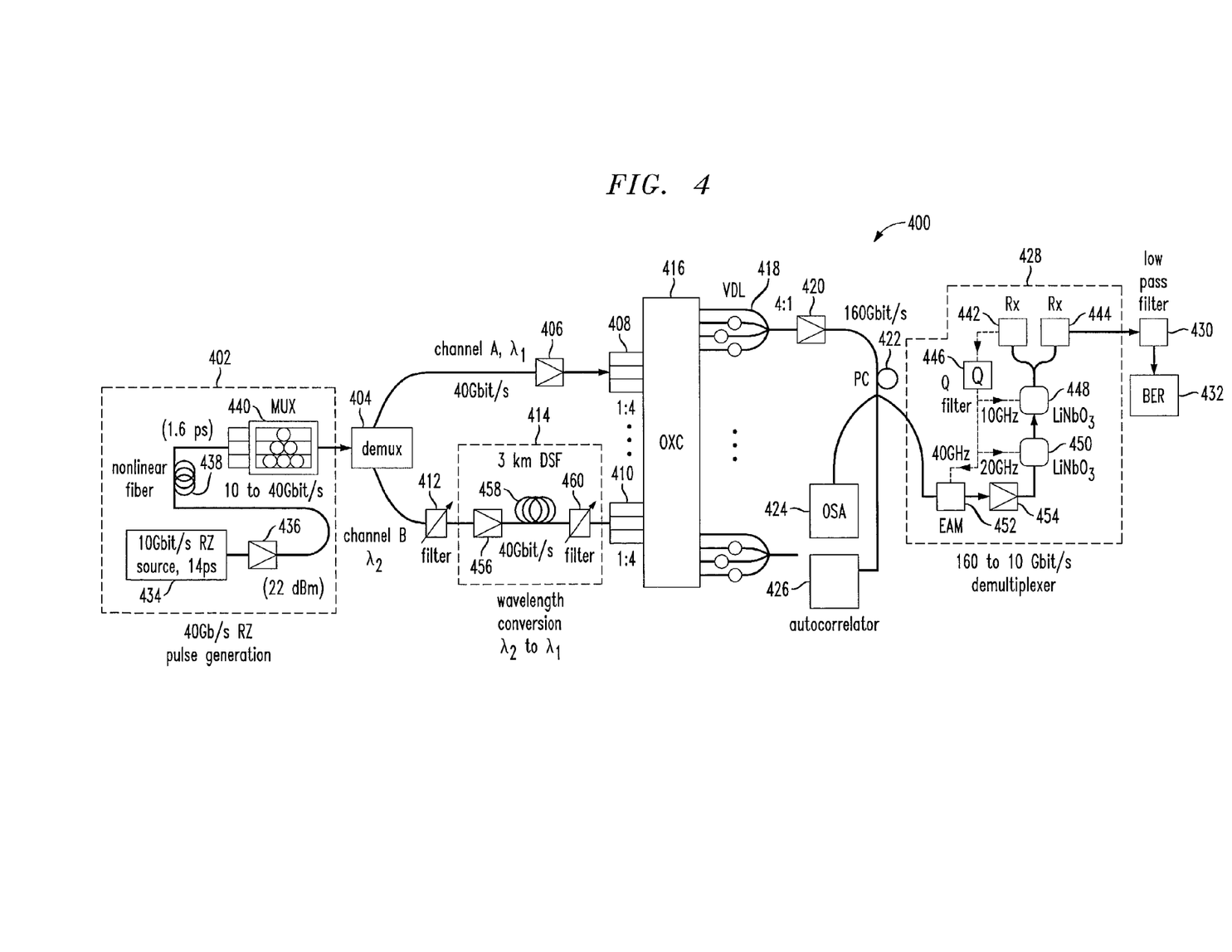
FIG. 4 illustrates an experimental communications system which performs switching in accordance with the invention.

FIG. 4 illustrates an experimental setup used to implement and test various switching features of the present invention. The setup 400 simulates switching operations that may be performed as part of a WDM/OTDM network, which is capable of receiving 160 Gbit/s per wavelength channel. The experimental setup 400 includes a 40 Gbit/s RZ pulse generator 402, a wavelength demux 404, 1:4 couplers 408, 410, a wavelength converter 414, an OXC 416, VDLs 418, a polarization controller (PC) 422, an optical spectrum analyzer (OSA) 424 for reading test results, an autocorrelator 426, a 160 to 10 Gb/s demux 428, a bit error rate (BER) analyzer 432, various amplifiers 406, 420, and filters 412, 430. While one wavelength converter 414 is shown in FIG. 4, it is to be understood that in an actual implementation one such converter exists for each input of the OXC upon which wavelength conversion is to be performed.

Rather than use two 160 Gbit/s TDM input streams (λ1 and λ2) from the beginning the experimental setup was simplified by using multiple 40 Gbit/s signals and optical couplers 408, 410 at the input of the optical cross connect switch 416 to simulate the results of time slot demultiplexing a 160 Gbits/s signal into 4 40 Gbits/s signals.

Pulse generator 402 includes a 10 Gbit/s RZ source 434, an amplifier 436, non-linear fiber 438 and a 10 to 40 Gbit/s mux 440. Wavelength converter 414 further includes an amplifier 456, dispersion shift fiber (DSF) 458, and a filter 460. 160 to 10 Gb/s demux 430 includes electro-absorption modulator (EAM) 452, amplifier 454, LiNbO$_3$ modulators 448, 450, Q filter 446, and receivers 442, 444.

Operation of the experimental setup 400 will now be described. A test signal is generated by pulse generator 402. The generated signal simulates a transmitted single from, e.g., a previous switch, in an optical network path. 10 Gbit/s RZ source 434 generates a 10 GHz train of 14 ps pulses at 1548.6 nm by driving an EAM with a 10 GHz sinusoidal RF tone. The train is then modulated by a 10 Gbit/s pseudorandom binary sequence (PRBS) of length $2^{31}-1$ using a LiNbO$_3$ modulator. The modulated signal is compressed and regenerated by two fiber stages 438 to obtain a broadened spectrum. The compressed signal is multiplexed by a two-stage fiber delay-line multiplexer 440 to provide a 40 Gbit/s data signal.

A wavelength division multiplexer (WDM) 404 is used to split the broadened spectrum, resulting in two different wavelengths (λ1 and λ2) each having a data rate of 40 Gbit/s. In an actual system the WDM 404 would be replaced with a wavelength demux that separates the channels of an input line accordingly to wavelength as in the FIG. 3A embodiment.

As mentioned earlier in WDM networks each channel is represented by a different wavelength. Therefore the two resulting wavelengths from the WDM 404 will be called channel A and channel B. The pulse widths for channel A ($\lambda_1$) at 1552 nm and channel B ($\lambda_2$) at 1549 nm are 1.6 ps and 2.3 ps, respectively. The signals at $\lambda_1$ and $\lambda_2$ are both divided into four timeslots by 1:4 couplers 408, 410, respectively. Since each timeslot carries 40 Gbit/s, a 160 Gbit/s per wavelength channel input has been simulated.

In an actual implementation such as the one shown in FIG. 3A, the couplers 408, 410, would be replaced with timeslot demultiplexers, e.g., timeslot demuxes 304, 326.

The simulated timeslot signals representing TDM channels are switched in the OXC 416, while remaining in the optical domain. In actual embodiments the switching may be controlled by routing logic. The switching may involve exchanging time slot signals corresponding to a signal of the first wavelength for time slot signals corresponding to the signal of the second wavelength. In such cases wavelength conversion is required.

When the timeslots at one wavelength, e.g., $\lambda_2$, are exchanged with timeslots from a second wavelength, e.g., $\lambda_1$, wavelength conversion is performed to convert the signal at $\lambda_2$ to that a signal of wavelength $\lambda_1$. Wavelength converter 414 is used for this purpose. In the exemplary setup shown in FIG. 4 the wavelength conversion is performed before the OXC 416, but it can be done after the OXC 416, e.g., at selected output ports.

Wavelength conversion, in this exemplary embodiment is based on super-continuum generation (See J. Yu et al., ECOC 2001, PD-10; and T. Durhuus et al., J. Lightwave Techn., 14, 6, pp. 942–954, 1996.).

Figure 5:
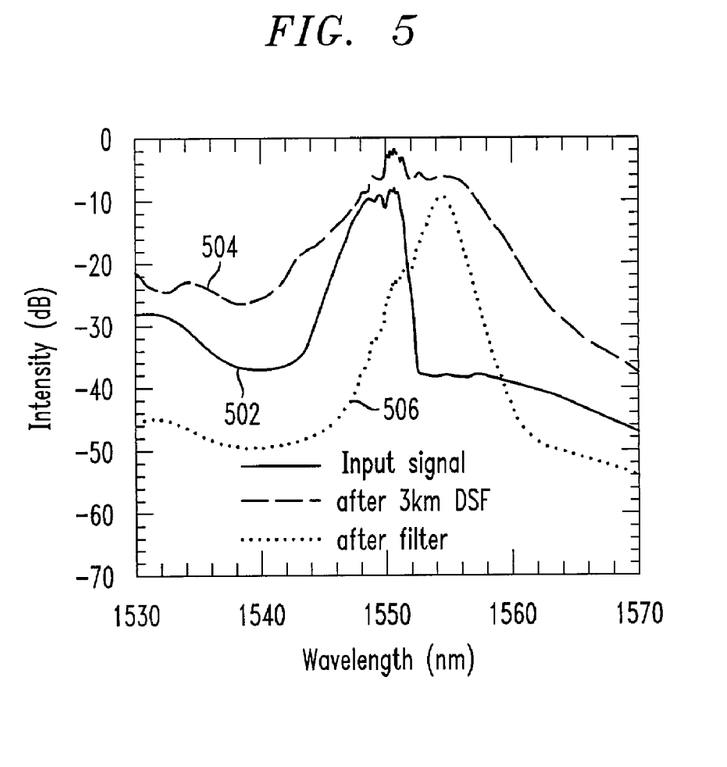
FIG. 5 illustrates three signal plots representing the different stages of a wavelength conversion operation.

FIG. 5 shows a graphic illustration of wavelength conversion. The original spectrum of a 40 Gbit/s short pulse is shown in FIG. 5 as curve 502. The signal is passed through, e.g., a high power erbium-doped fiber amplifier (EDFA), represented as an amplifier 456 and dispersion shift fiber 458, to broaden the spectrum as shown by curve 504. Next, by using a bandpass filter 460 transparent at $\lambda_1$, we obtain the converted 40 Gbit/s signal as shown by curve 506. The pulse width of the converted signal is 1.6 ps. Wavelength conversions for $\lambda_1$ to $\lambda_2$ may be performed using a similar device but including a bandpass filter transparent at $\lambda_2$.

Referring once again to FIG. 4, once the switched timeslot channels leave the OXC 416, as part of the process of recombining the various timeslot signals representing TDM channels, the signals are synchronized relative to each other using variable delay lines (VDLs) 418. An active feedback mechanism, 426, 422 is implemented to insure accurate synchronization. Such a feedback mechanism may be included, in accordance with the present invention, in the systems shown in FIGS. 3A and 3B.

As discussed above, the variable delay lines 418 can be implemented by various techniques, such as separating two collimated fibers by mechanical stages, temperature tuning of fibers by large or localized heaters, or stretching of fibers using piezoelectric crystal.

Figure 7A:
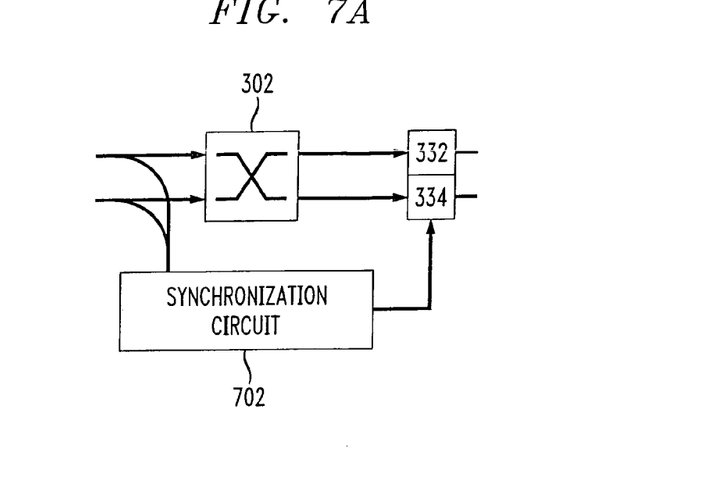
FIGS. 7A through 7C illustrate various synchronization feedback mechanisms which may be used to control variable delay lines in accordance with the invention.
Figure 7B:
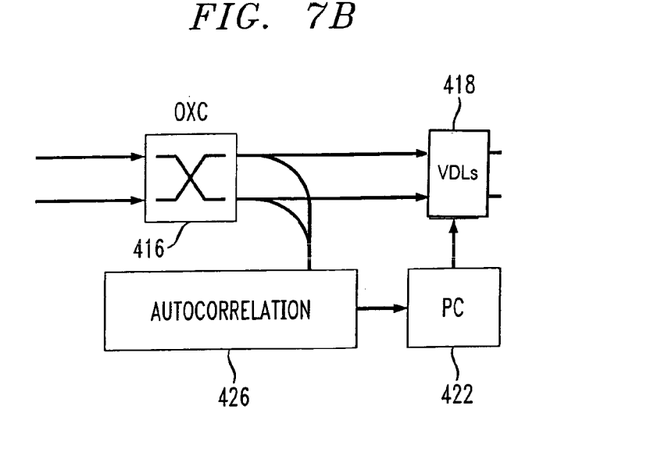
Figure 7C:
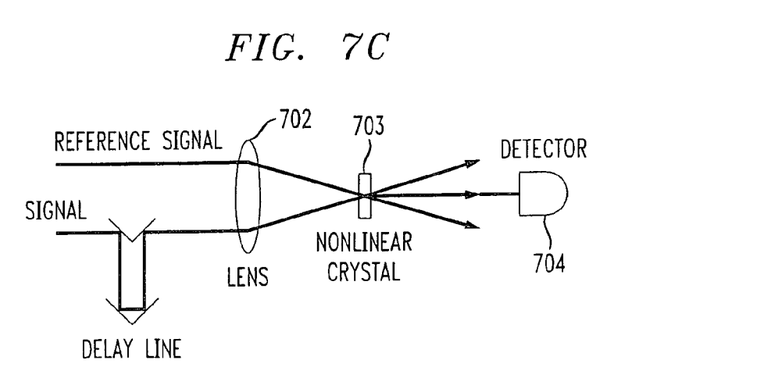

FIGS. 7A through 7C illustrate schematic diagrams of arrangements which can be used to synchronize the variable delay lines used in the FIG. 3A, 3B and FIG. 4 embodiments based on feedback. In FIG. 7A, system feedback is used by synchronization circuit 702 to control delay lines 332, 334.

In the FIG. 7B embodiment used in the experimental setup of FIG. 4, the synchronization circuit 702 is replaced with an autocorrelation circuit 426 and personal computer 422 which controls delay line 418 synchronization. The active feedback mechanism in the experimental setup 400 includes autocorrelator 426 and polarization controller (PC) 422. The autocorrelator 426 processes output signals from the OXC 416, and the PC 422 uses the information from the autocorrelator 426 to control the variable delay lines 418, and synchronize the time slot channels.

It is expected that once all the signals are synchronized, the variation and fluctuation of the time-slots change at a much slower time scale, of the order of second to minutes, caused by temperature changes and mechanical vibration. It is also expected that the delays for all possible operating wavelengths and connections of the optical cross-connect and the optical add-drop are initially measured. Thus, the feedback loop needs not be as fast as the signal modulation.

Assuming the signal being subject to the delay is of the return to zero format, the clock component can be generated directly from the signal. At the present time data and clock recover integrated circuits exist which may be used for this purpose. They are commercially available for speeds up to 2.5 Gb/s. Ultra-fast clock recovery for speeds of 40 Gb/s to 100 Gb/s can be performed using a super conducting Josephson circuit. The clock signal can be used to drive the variable delay line in the synchronization process.

Alternatively, synchronization can be performed as a function of cross-correlating two signals, e.g., a reference signal obtained by shifting the signal to be delayed and the signal to be delayed, using non-linear optical conversion as shown in FIG. 7C. In the FIG. 7C example, the reference signal and signal to be delayed are passed through lens 702, and nonlinear crystal 703 prior to being received by detector 704. The output of detector 704, which represents the results of an autocorrelation operation which is used to control the delay line corresponding to the signal subject to the auto-correlation operation. In this configuration, the delay line is changed to optimize the overlapping of two pulses in the signal. The amount of delay is measured and is used to control the corresponding variable delay line.

In various other embodiments, faster delay lines based on, e.g., electro-optics effects, can be used to further reduce the feedback time from seconds to microseconds.

Figure 6:
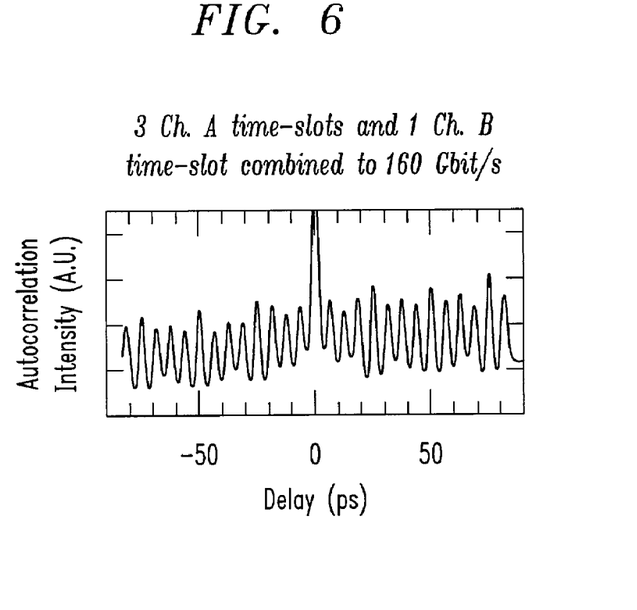
FIG. 6 illustrates an autocorrelation intensity versus delay plot of a switched signal.
Figure 8:
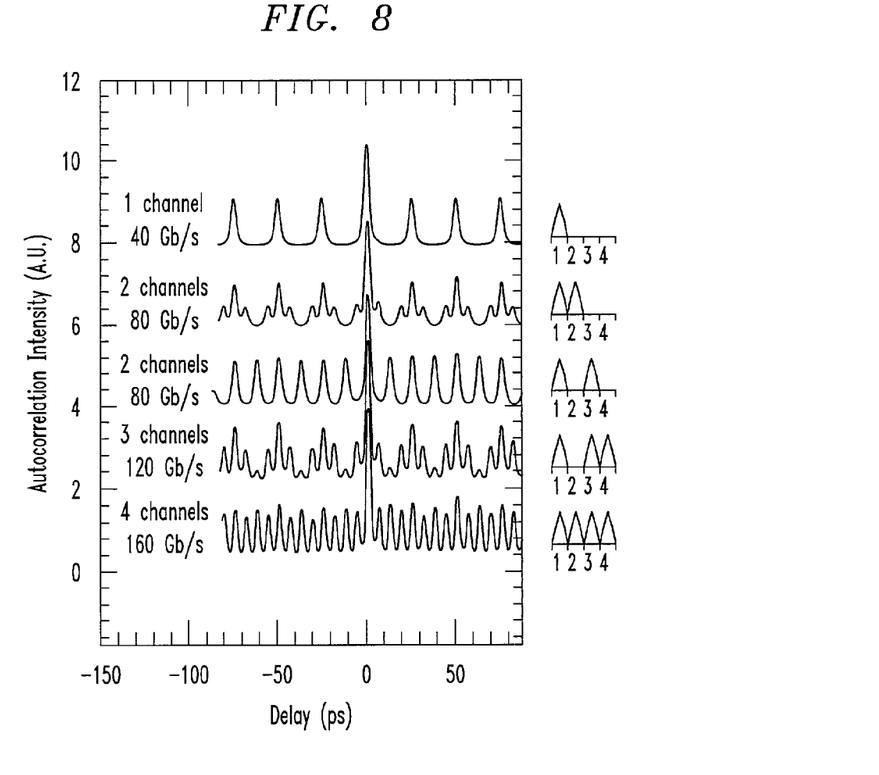
FIG. 8 illustrates an autocorrelation intensity versus delay plot for five different timeslot configurations.

An autocorrelator trace of a 160 Gbit/s OTDM signal at $\lambda_1$ with one timeslot switched and its wavelength converted from $\lambda_2$ to $\lambda_1$, is illustrated in FIG. 6. FIG. 8 illustrates the autocorrelation of switching and/or reshuffling up to four 40 Gbit/s signals using the OXC 416. Depending on the implementation of the variable delay lines 418, signals can populate different timeslots. Five possible arrangements are shown in FIG. 8. Note that there are two autocorrelation traces for two alternate 80 Gbit/s signal configurations. As mentioned earlier in order to synchronize the delay between different channels, the autocorrelation of the output signals are monitored using a computer, e.g., PC 422. In one exemplary embodiment, a least square minimization algorithm, which can converge within 30 iterations, or 1–2 seconds, is used. The time is limited by the mechanical stage of the autocorrelator 426. Many factors are considered when synchronizing the output signals. For example, different paths within the OXC 416 can have different relative delays, e.g., one path may be physically longer than a second path. Therefore, the delay for all possible paths in OXC 416 are tabulated and used by PC 422 when controlling the variable delay lines 418.

Figure 9:
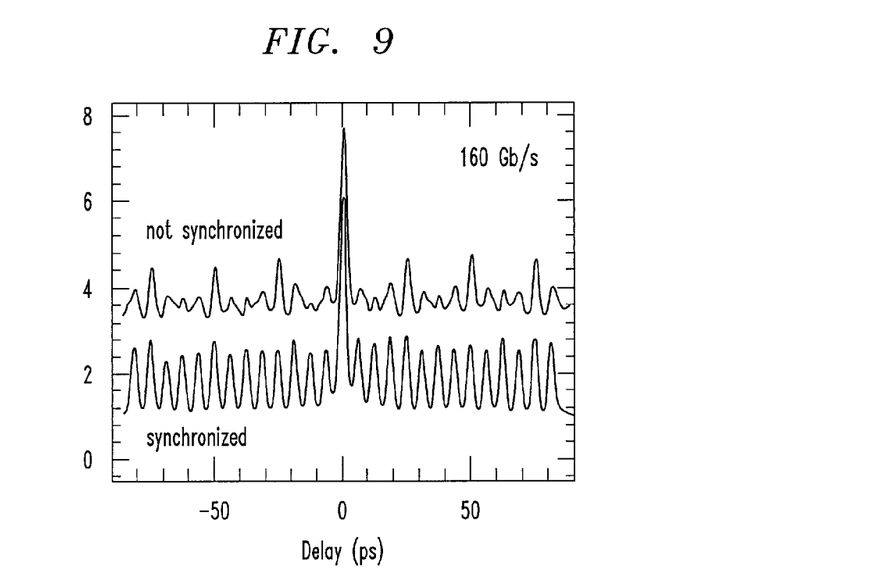
FIG. 9 illustrates the benefits of a synchronization feedback mechanism.

The autocorrelation comparison of a synchronized and an unsynchronized 160 Gbit/s signal, of FIG. 9, illustrates the positive effects of the feedback mechanism. Note that the curve for the synchronized signal is cleaner than the curve for the unsynchronized signal. Now that the signal leaving VDL 418 is synchronized, it is sent through 160 to 10 Gbit/s demultiplexer 428. Essentially this demux 428 reverses the expansion of the 10 Gbit/s source 434, converting the received 160 Gbit/s signal to a 10 Gbit/s signal so a BER can be obtained. After demultiplexing and filtering the signal BER analyzer 432 measures the error rate of the experimental setup 400.

Figure 10:
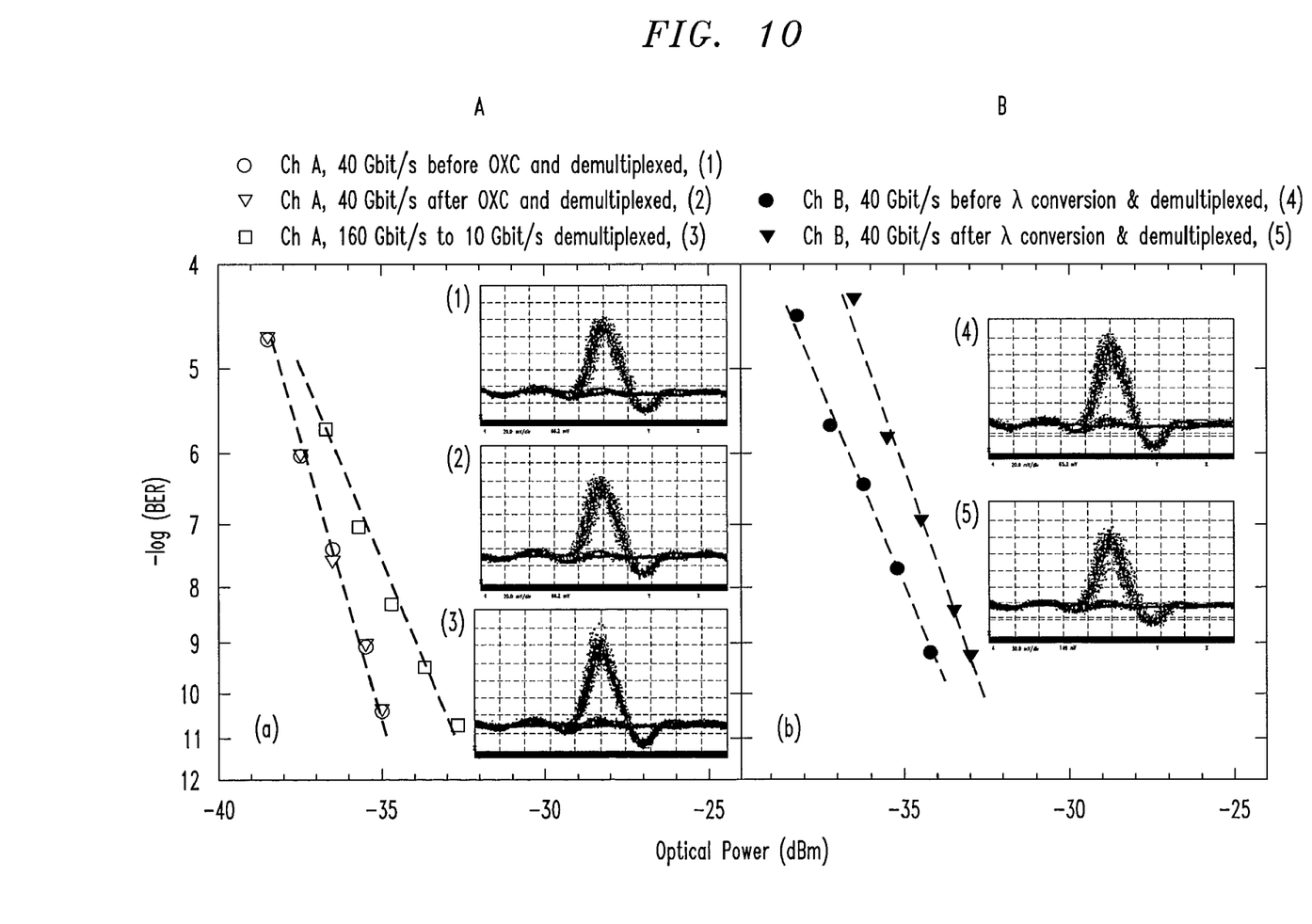
FIG. 10 illustrates bit error rates (BERs) before and after an OXC, a 160 to 10 Gbit/s demultiplexer and a wavelength converter.

Transmission penalties of the OXC 416, the wavelength converter 414, and the 160 to 10 Gbit/s demultiplexer 428 are now described to further explain the experimental setup 400. FIG. 10 illustrates the results of an analysis on a signal at various stages of experimental setup 400. Referring to graph A of FIG. 10, the circles illustrate the Bit Error Rate (BER) for a demultiplexed 40 Gbit/s signal before entering the OXC 416, and the triangles represent the signal after it has been through the OXC 416. Since the circles and the triangle are relatively in the same position, it is determined that the transmission penalty for the OXC 416 is negligible.

In the experimental setup 400 after a signal is passed through OXC 416, it is demultiplexed by 160 to 10 Gbit/s demux 428. Still referring to Graph A of FIG. 10, the squares represent the BER of a signal after demux 428. By comparing the BER for the triangles and the squares, it can be determined that the 160 to 10 Gbit/s demux 428 has approximately a 2 dB penalty. This penalty is caused by small crosstalk between adjacent time channels. The eye diagrams of the signal at the three different stages are also shown in Graph A of FIG. 10.

Now referring to Graph B of FIG. 10, the BERs of a signal before (circles) and after (triangles) wavelength converter 414 are shown. It can be estimated that the wavelength converter 414 has a transmission penalty of about 1.2 dB. The penalty is caused by intra-channel four wave mixing (FWM) and cross phase modulation (XPM). The different slope of the BER curves shown in Graph B of FIG. 10 is caused by the different pulse width before and after wavelength conversion. The eye diagrams for the demultiplexed 40 Gbit/s signals are also shown. Thus, signal transmission for the experimental setup 400, has a total of about 3.2 dB penalty for BER=$10^{-9}$. System stability can be observed over a measurement period of 12 hours.

It is to be understood that numerous variations on the above described methods and apparatus are possible without departing from the scope of the invention. For example, variable delay lines may be positioned at the input, as opposed to the output of the optical cross-connect switch used in, e.g., the FIG. 3 embodiment. In addition, it time division and/or wavelength division multiplexed optical signals may be supplied to some inputs of the optical cross-connect switch, e.g., for feed through purposes, while other signals are fully demultiplexed, prior to being supplied to the input of the optical cross-connect switch, to support time slot switching and/or wavelength switching.

What is claimed is:

1. A method of processing an optical signal in a manner that can be used to perform optical time slot switching, the method comprising:

optically demultiplexing a first time division multiplexed signal to produce a first plurality of demultipled signals;

supplying each of said first plurality of demultiplexed signals to a separate input of an optical switching device having a plurality of inputs and outputs;

using a plurality of optical time delay elements to couple at least some of the outputs of said optical switching device to a first optical time division multiplexer;

operating the first optical time division multiplexer to generate a second optical time division multiplexed signal by performing an optical time division multiplexing operation; and using a feedback signal generated from at least one optical signal delayed by one of said optical time delay elements to control optical time delay element synchronization.

2. A method of processing an optical signal in a manner that can be used to perform optical time slot switching, the method comprising:

optically demultiplexing a first time division multiplexed signal to produce a first plurality of demultipled signals;

supplying each of said first plurality of demultiplexed signals to a separate input of an optical switching device having a plurality of inputs and outputs;

using a plurality of optical time delay elements to couple at least some of the outputs of said optical switching device to a first optical time division multiplexer;

operating the first optical time division multiplexer to generate a second optical time division multiplexed signal by performing an optical time division multiplexing operation;

optically demultiplexing a third time division multiplexed signal to produce a second plurality of demultiplexed signals;

supplying at least some of said second plurality of demultiplexed signals to separate inputs of said optical switching device;

using an additional plurality of optical time delay elements to couple at least some of the outputs of said optical switching device corresponding to a second optical time division multiplexer; and operating the second optical time division multiplexer to generate a fourth optical time division multiplexed signal.

3. The method of claim 2, wherein the first and second optical time division multiplexed signals are signals of a first wavelength and wherein said third and fourth optical time division multiplexed signals are signals of a second wavelength, the second wavelength being different from said first wavelength, the method further comprising:

performing a wavelength conversion operation on at least one of the optical signals subject to switching by said optical switching device.

4. The method of claim 3, wherein said step of performing a wavelength conversion operation includes:

converting an optical signal output by said first optical time division multiplexer to said second wavelength prior to switching by said optical switching device.

5. The method of claim 3, wherein said step of performing a wavelength conversion operation includes:

converting an optical signal output by said first optical time division multiplexer to said second wavelength subsequent to switching by said optical switching device but prior to multiplexing by said second time division multiplexer.

6. The method of claim 3, further comprising:

performing a wavelength division demultiplexing operation on a first wavelength division multiplexed signal to generate said first and third time division multiplexed signals.

7. The method of claim 6, further comprising:

performing a wavelength division multiplexing operation on said second and forth time division multiplexed signals to produce a second wavelength division multiplexed signal.

8. The method of claim 7, further comprising:

supplying a third wavelength division multiplexed signal to an input of said optical switching device.

9. The method of claim 8, further comprising:

supplying a fifth time division multiplexed signal to an input of the optical switching device.

10. The method of claim 9, wherein the optical switching device is an optical cross-connect switch.

11. An apparatus for performing switching operations on optical signals, the apparatus comprising:

an optical switching device having a plurality of inputs and outputs;

a first time division demultiplexer for demultiplexing a first time division multiplexed signal into a first plurality of optical signals corresponding to different communications channels, the first time division demulitiplexer having an output for each of said plurality of optical signals, each output being coupled to a corresponding input of the optical switching device;

a first time division multiplexer for multiplexing optical signals supplied to said first multiplexer to produce at an output of the first multiplexer a second optical time division multiplexed signal;

a first plurality of variable optical time delay elements for coupling at least some outputs of said optical switching device to said first time division multiplexer; and means for synchronizing said variable optical time delay elements as a function of a feedback signal generated from one of the switched optical signals supplied to an input of said first time division multiplexer.

12. The apparatus of claim 11, wherein said means for synchronizing includes an autocorrelation device.

13. The apparatus of claim 11, wherein said optical switching device is an optical cross-connect switch.

14. An apparatus for performing switching operations on optical signals, the apparatus comprising:

an optical switching device having a plurality of inputs and outputs;

a first time division demultiplexer for demultiplexing a first time division multiplexed signal into a first plurality of optical signals corresponding to different communications channels, the first time division demulitiplexer having an output for each of said plurality of optical signals, each output being coupled to a corresponding input of the optical switching device;

a first time division multiplexer for multiplexing optical signals supplied to said first multiplexer to produce at an output of the first multiplexer a second optical time division multiplexed signal;

a first plurality of variable optical time delay elements for coupling at least some outputs of said optical switching device to said first time division multiplexer;

a second time division demultiplexer for demultiplexing a third time division multiplexed signal into a second plurality of optical signals corresponding to different communications channels, the second time division demulitiplexer having an output for each of said plurality of optical signals, each output being coupled to a corresponding input of the optical switching device;

a second time division multiplexer for multiplexing optical signals supplied to said second multiplexer to produce at an output of the second multiplexer a fourth optical time division multiplexed signal; and a second plurality of variable optical time delay elements for coupling at least some outputs of said optical switching device to said second time division multiplexer.

15. The apparatus of claim 14, further comprising:

a wavelength division demultiplexer coupled to the first and second wavelengh division demultiplexers for generating said first and third time division multiplexed signals by demultiplexing a wavelength division multiplexed signal.

16. The apparatus of claim 15, further comprising:

a wavelength division multiplexer coupled to the first and second time division multiplexers for performing a wavelength division multiplexing operation on said second and fourth time division multiplexed signals.

17. The apparatus of 15, further comprising:

a frequency conversion device for performing frequency conversion operations on at least some of the optical signals supplied to said first time division multiplexer.

18. An apparatus for performing switching operations on optical signals, the apparatus comprising:

an optical switching device having a plurality of inputs and outputs;

a first time division demultiplexer for demultiplexing a first time division multiplexed signal into a first plurality of optical signals corresponding to different communications channels, the first time division demulitiplexer having an output for each of said plurality of optical signals, each output being coupled to a corresponding input of the optical switching device;

a first plurality of variable optical time delay elements for coupling at least some inputs of said optical switching device to said first time division demultiplexer;

a first time division multiplexer having inputs coupled to outputs of said optical switching device for producing at an output of the first multiplexer a second optical time division multiplexed signal; and means for synchronizing said variable optical time delay elements as a function of a feedback signal generated from one of the switched optical signals supplied to an input of said first time division multiplexer.

19. An apparatus for performing switching operations on optical signals, the apparatus comprising:

an optical switching device having a plurality of inputs and outputs;

a first time division demultiplexer for demultiplexing a first time division multiplexed signal into a first plurality of optical signals corresponding to different communications channels, the first time division demulitiplexer having an output for each of said plurality of optical signals, each output being coupled to a corresponding input of the optical switching device;

a first plurality of variable optical time delay elements for coupling at least some inputs of said optical switching device to said first time division demultiplexer;

a first time division multiplexer having inputs coupled to outputs of said optical switching device for producing at an output of the first multiplexer a second optical time division multiplexed signal;

a second time division demultiplexer for demultiplexing a third time division multiplexed signal into a second plurality of optical signals corresponding to different communications channels, the second time division demulitiplexer having an output for each of said plurality of optical signals;

a second plurality of variable optical time delay elements for coupling at least some outputs of said second time division demultiplexer to optical switching device; and a second time division multiplexer for multiplexing optical signals supplied to said second multiplexer to produce at an output of the second multiplexer a fourth optical time division multiplexed signal.

20. The apparatus of claim 19, further comprising:

a wavelength division demultiplexer coupled to the first and second wavelengh division demultiplexers for generating said first and third time division multiplexed signals by demultiplexing a wavelength division multiplexed signal.

21. The apparatus of claim 20, further comprising:

a wavelength division multiplexer coupled to the first and second time division multiplexers for performing a wavelength division multiplexing operation on said second and fourth time division multiplexed signals.

* * * * *